United States Patent
Takeuchi et al.

(10) Patent No.: US 7,093,371 B2
(45) Date of Patent: Aug. 22, 2006

(54) DIRECTION INDICATING DEVICE

(75) Inventors: Kunihito Takeuchi, Tokyo (JP); Fumitaka Sato, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/720,348

(22) Filed: Nov. 25, 2003

(65) Prior Publication Data
US 2004/0111907 A1   Jun. 17, 2004

(30) Foreign Application Priority Data
Dec. 11, 2002   (JP)  ............................. 2002-359709

(51) Int. Cl.
*G01C 17/30*   (2006.01)
(52) U.S. Cl. ..................... 33/355 R; 33/356
(58) Field of Classification Search .................. 33/264, 33/355 R, 356, 357
See application file for complete search history.

(56) References Cited

U.S. PATENT DOCUMENTS

| | | | | |
|---|---|---|---|---|
| 5,095,631 A | * | 3/1992 | Gavril et al. ................. 33/361 |
| 5,172,322 A | * | 12/1992 | Takano et al. ............... 701/207 |
| 5,349,529 A | * | 9/1994 | Masumoto et al. ........... 702/85 |
| 5,349,530 A | | 9/1994 | Odagawa | |
| 5,440,303 A | * | 8/1995 | Kinoshita ................... 340/901 |
| 5,440,484 A | * | 8/1995 | Kao ........................... 701/207 |
| 5,488,778 A | * | 2/1996 | Potter ....................... 33/355 R |
| 5,761,094 A | * | 6/1998 | Olson et al. ................. 702/92 |
| 5,828,984 A | * | 10/1998 | Cage et al. .................. 702/92 |
| 6,044,315 A | * | 3/2000 | Honeck et al. ............... 701/35 |
| 6,049,761 A | * | 4/2000 | Hoshino et al. .............. 702/92 |
| 6,513,252 B1 | * | 2/2003 | Schierbeek et al. ........... 33/356 |
| 6,539,639 B1 | * | 4/2003 | Smith .......................... 33/356 |
| 6,651,003 B1 | * | 11/2003 | Woloszyk et al. ........... 701/224 |
| 6,842,991 B1 | * | 1/2005 | Levi et al. .................... 33/356 |
| 6,871,411 B1 | * | 3/2005 | Kang et al. ................... 33/356 |

FOREIGN PATENT DOCUMENTS

JP     5-280988 A     10/1993

* cited by examiner

*Primary Examiner*—Diego Gutierrez
*Assistant Examiner*—Amy R. Cohen
(74) *Attorney, Agent, or Firm*—Sughrue Mion, PLLC

(57) ABSTRACT

A direction indicating device in which a current display direction is determined in consideration of the historical information of a direction of vehicle specified by a direction specifying unit 1 and a previous display direction, to be specific, in a case where the current direction of vehicle specified by the direction specifying unit 1 agrees with a previous direction of vehicle, the current display direction is changed to agree with the current direction of vehicle, and in a case where the current direction of vehicle specified by the direction specifying unit 1 is different from the previous direction of vehicle, the current display direction is made to agree with the previous display direction.

8 Claims, 5 Drawing Sheets

| PREVIOUS DISPLAY DIRECTION | N | | N | |
|---|---|---|---|---|
| ... | | | | |
| PREVIOUS DIRECTION OF VEHICLE | N | | | N |
| CURRENT DIRECTION OF VEHICLE | | NNE | NNW | |
| CURRENT DISPLAY DIRECTION | N | | N | |

FIG.5

| PREVIOUS DISPLAY DIRECTION | N | N | | N |
|---|---|---|---|---|
| ... | | | | |
| PREVIOUS DIRECTION OF VEHICLE | NNW | | NNW | NW |
| CURRENT DIRECTION OF VEHICLE | | NE | N | N |
| CURRENT DISPLAY DIRECTION | N | | NNW | N |

FIG.6

| PREVIOUS DISPLAY DIRECTION | N | N | N | |
|---|---|---|---|---|
| ... | | | | |
| PREVIOUS DIRECTION OF VEHICLE | NNE | NE | NE | NNE |
| CURRENT DIRECTION OF VEHICLE | | | ESE | ENE |
| CURRENT DISPLAY DIRECTION | NNE | NNE | NNE | NNE |

DIRECTION INDICATING DEVICE

BACKGROUND OF THE INVENTION

1. Field of the Invention

The present invention relates to a direction indicating device for displaying direction of a vehicle.

2. Description of the Related Art

An elevated bridge, an iron plate covering over a drain trench which is buried in a road, and the like, are made of magnetic materials such as iron frames and iron bars. Thus, when a vehicle runs on the iron plate over the drain trench and the elevated bridge, there is a case where a direction indicating device that detects geomagnetism to determine a direction of vehicle takes in the disturbance of geomagnetism caused by the above mentioned magnetic materials (hereinafter referred to as external disturbance) to cause an error in the determined direction of vehicle.

Then, a conventional direction indicating device finds an amount of external disturbance from the detected value by a geomagnetic sensor, and when the external disturbance is large, it assigns a large weighting to the detected values of the geomagnetic sensor up to the previous times and when the external disturbance is small, it assigns a large weighting to the current detected value of the geomagnetic sensor thereby to find a mean value of the detected values of the geomagnetic sensor (see, for example, patent document 1).

[Patent document 1] Japanese Unexamined Patent Publication No. 5-280988, Paragraph number [0012] to [0052] and FIG. 1.

Since the conventional direction indicating device is structured in the above mentioned manner and it finds external disturbance from the detected values of the geomagnetic sensor and assigns the weighting to the detected values according to the amount of external disturbance, the conventional direction indicating device has a problem that if the conventional direction indicating device takes in large external disturbance when the vehicle is turning, because it assigns a large weighting to the detected values of the geomagnetic sensor up to the previous times, it degrades trackability in a display direction when the vehicle is turning.

In addition, when vehicles are different in type from each other, the geomagnetic sensors are mounted in different positions according to their types (for example, a distance from the ground to the geomagnetic sensor is different between a vehicle of the sedan type and a vehicle of the recreational vehicle type because a height of the vehicle is different between them) and when the geomagnetic sensors are mounted in the different positions, the detected values of the geomagnetic sensors become different from each other. Thus, the conventional direction indicating device has also a problem that it is required to assign suitable weighting to the detected values of geomagnetic sensor according to the position where the geomagnetic sensor is mounted.

SUMMARY OF THE INVENTION

The present invention has been made so as to solve the above mentioned problems. It is an object of the present invention to provide a direction indicating device capable of ensuring stability and trackability in a display direction at the same time.

A direction indicating device in accordance with the present invention is arranged to determine a current display direction in consideration of historical information of the direction of vehicle specified by a direction specifying unit and a previous display direction.

As described above, the present invention is so structured as to determine the current display direction in consideration of the historical information of the direction of vehicle specified by the direction specifying unit and the previous display direction, so that the present invention produces an effect of ensuring stability and trackability in the display direction at the same time.

BRIEF DESCRIPTION OF THE DRAWINGS

FIG. 5 is an explanatory drawing to show another example of determining a display direction.

FIG. 6 is an explanatory drawing to show other example of determining a display direction.

DETAILED DESCRIPTION OF THE PREFERRED EMBODIMENTS

The preferred embodiments of the present invention will be described below.

EMBODIMENT 1

Figure 1:
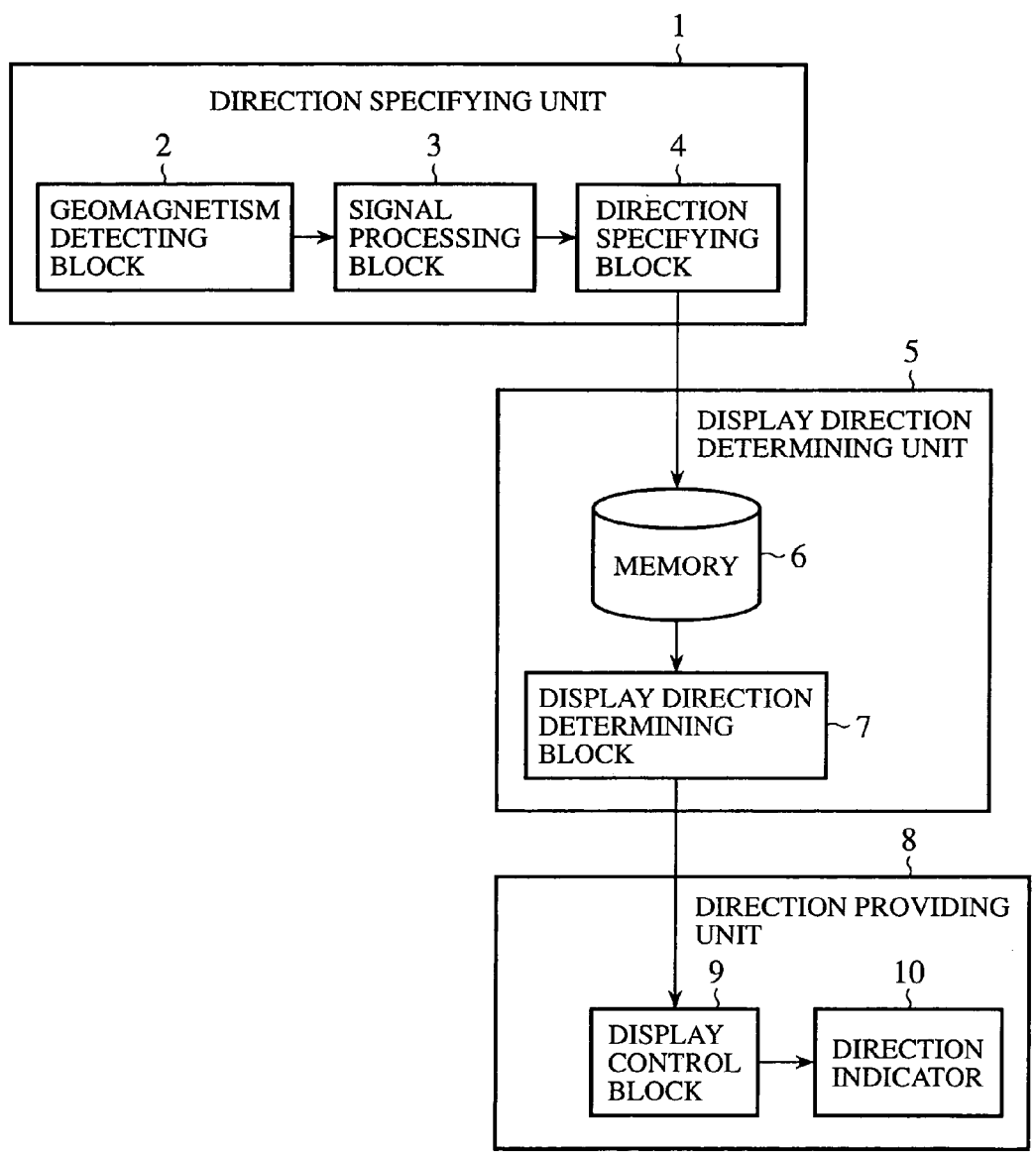
FIG. 1 is a block diagram to show a direction indicating device in accordance with embodiment 1 of the present invention.

FIG. 1 is a block diagram to show a direction indicating device in accordance with embodiment 1 of the present invention. In the figure, a direction specifying unit 1 is structured of a geomagnetism detecting block 2, a signal processing block 3, and a direction specifying block 4 and detects geomagnetism to specify a direction of vehicle.

The geomagnetism detecting block 2 is configured of, for example, a geomagnetic sensor and repeatedly detects geomagnetism. The signal processing block 3 is configured of, for example, an operational amplifier, a low pass filter and the like and amplifies the detected data of the geomagnetism detecting block 2 and removes high frequency noises included in the detected data. The direction specifying block 4 is configured of, for example, a microprocessor and the like and calculates a mean value of the detected data output from the signal processing block 3 and specifies a directional section to which the mean value belongs as a direction of the vehicle.

A display direction determining unit 5 is structured of a memory 6 and a display direction determining block 7 and determines a current display direction in consideration of the historical information of direction of the vehicle (a current direction of vehicle, a previous direction of vehicle, and a second previous direction of vehicle) specified by the direction specifying unit 1 and a previous display direction (display direction which is indicated at present by a direction indicator 10).

The memory 6 stores the historical information of the direction of vehicle specified by the direction specifying block 4 and the previous display direction. The display direction determining block 7 is configured of, for example, a microprocessor and the like and compares the respective directions of vehicle stored in the memory 6 with each other to determine the current display direction.

A direction providing unit 8 is structured of, for example, a display control block 9 and the direction indicator 10 and provides a current display direction determined by the display direction determining unit 5.

The display control block 9 is configured of, for example, a driver IC and the like and controls the direction indicator 10 in such a way that the direction indicator 10 indicates the current display direction determined by the display direction determining block 7.

Figure 2:
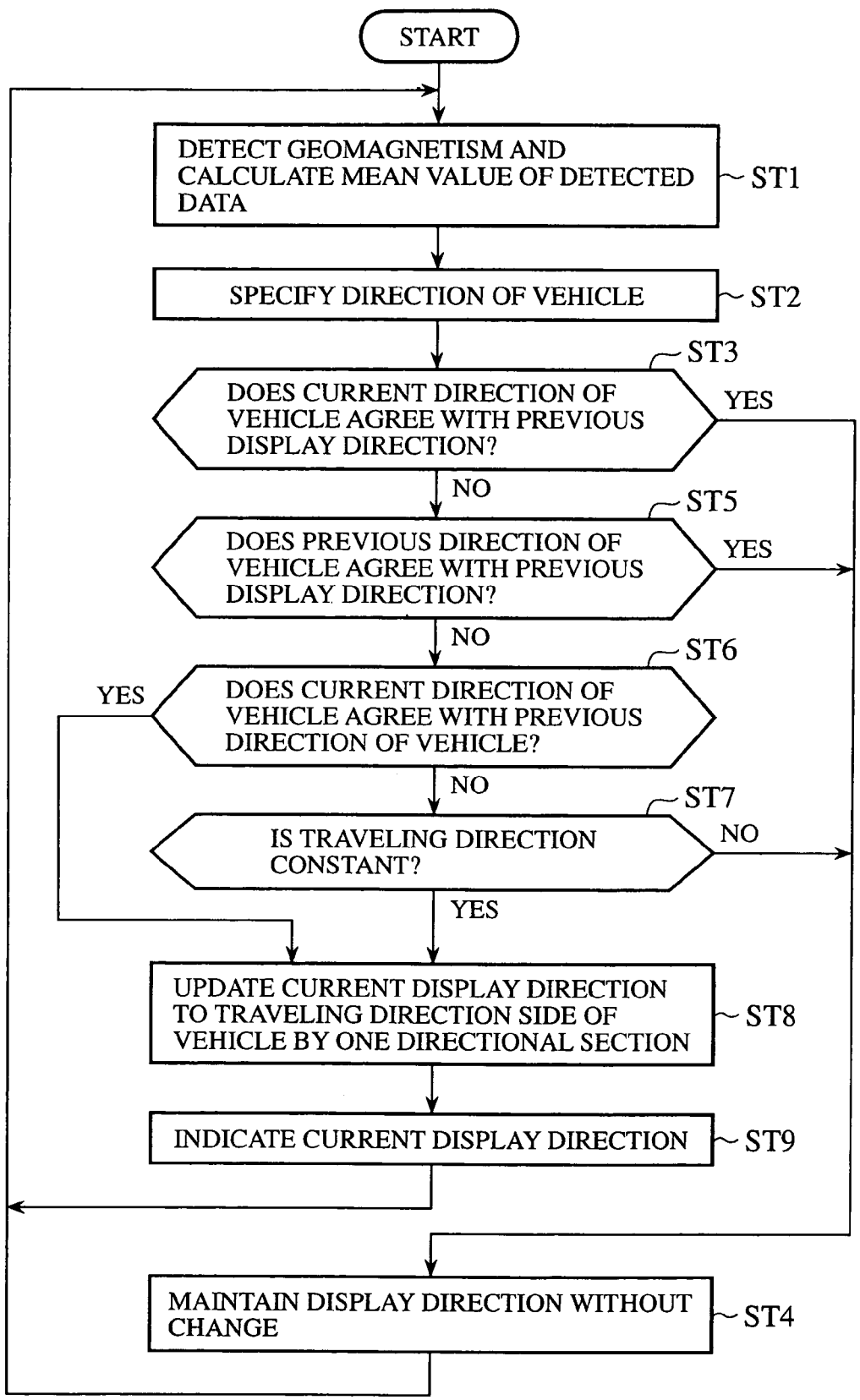
FIG. 2 is a flow chart to show a process flow of the direction indicating device in accordance with the embodiment 1 of the present invention.

FIG. 2 is a flow chart to show a process flow of the direction indicating device in accordance with the embodiment 1 of the present invention.

Next, operation will be described.

First, the geomagnetism detecting block 2 of the direction specifying unit 1 repeatedly detects geomagnetism at intervals of, for example, every 50 m sec and outputs detected data to the signal processing block 3.

When the signal processing block 3 receives the detected data from the geomagnetism detecting block 2, it amplifies the detected data and removes high frequency noises included in the detected data.

The direction specifying block 4 calculates a mean value of the detected data output from the signal processing block 3 so as to lessen effect of external disturbance (ST1). For example, if a display updating period (sampling period) of the direction indicator 10 is 1 sec, the direction specifying block 4 calculates a mean value of the 20 detected data output from the geomagnetism detecting block 2.

Figures 3, 4:
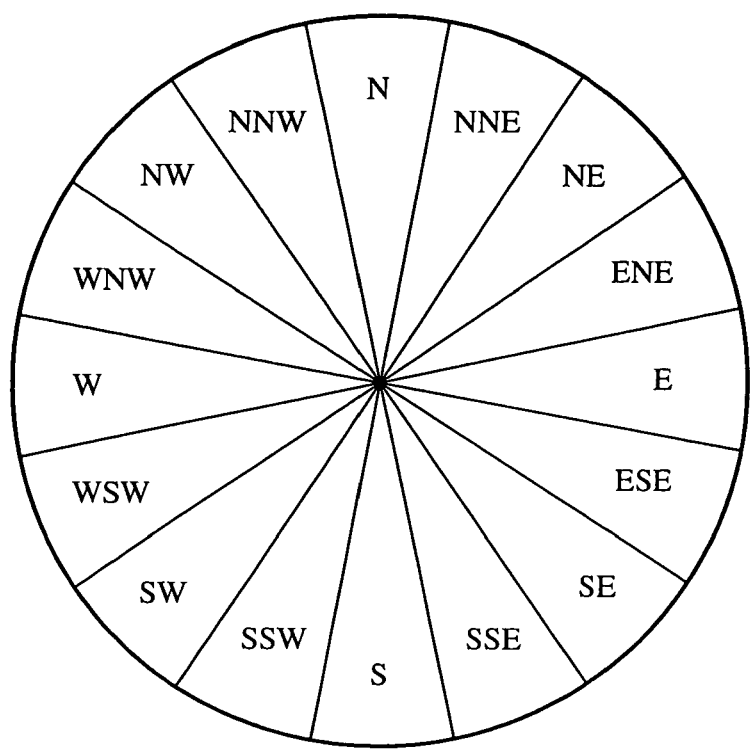
FIG. 3 is an explanatory drawing to show directional sections which are divided into 16 equal blocks.
FIG. 4 is an explanatory drawing to show an example of determining a display direction.

When the direction specifying block 4 calculates the mean value of the detected data, it specifies a directional section to which the mean value of the detected data belongs as the direction of vehicle (ST2). FIG. 3 shows directional sections divided into 16 equal blocks. For example, if the mean value of the detected data is 358 degrees, the direction specifying block 4 specifies that the direction of vehicle is N (north) and if the mean value of detected data is 45 degrees, it specifies that the direction of vehicle is NE (north east).

In this regard, the direction of vehicle specified by the direction specifying block 4 is stored in sequential manner in the memory 6 of the display direction determining unit 5.

The display direction determining block 7 of the display direction determining unit 5 determines a current display direction in consideration of the historical information of the direction of vehicle stored in the memory 6 (the current direction of vehicle, the previous direction of vehicle, and the second previous direction of vehicle) and the previous display direction (display direction which is indicated at present by the direction indicator 10).

To be more specific, the display direction determining block 7 determines the current display direction in a manner described below.

At first, the display direction determining block 7 determines whether or not the current direction of vehicle which is specified by the direction specifying block 4 agrees with the previous display direction (step ST3). In a case where the current direction of vehicle specified by the direction specifying block 4 agrees with the previous display direction, the display direction determining block 7 maintains the display direction without change (step ST4).

On the other hand, in a case where the current direction of vehicle specified by the direction specifying block 4 is different from the previous display direction, the display direction determining block 7 determines whether or not the direction of vehicle previously specified by the direction specifying block 4 agrees with the previous display direction (step ST5).

In a case where the direction of vehicle previously specified by the direction specifying block 4 agrees with the previous display direction, there is a possibility that the current direction of vehicle might temporarily be shifted from actual direction by the effect of external disturbance. For this reason, in this stage, in view of preventing the display direction from being fluctuated by the effect of external disturbance the display direction determining block 7 maintains the display direction without change (step ST4). FIG. 4 shows an example corresponding to this situation.

In a case where the previous direction of vehicle is different from the previous display direction, the display direction determining block 7 determines whether or not the current direction of vehicle agrees with the previous direction of vehicle (step ST6).

In a case where the current direction of vehicle agrees with the previous direction of vehicle, there is little possibility that the direction of vehicle might temporarily be shifted from the actual direction by the effect of external disturbance. Thus, the display direction determining block 7 updates the current display direction to the traveling direction side of the vehicle by one directional section from the previous display direction (step ST8).

On the other hand, in a case where the current direction of vehicle is different from the previous direction of vehicle, there is a possibility that the vehicle runs through a magnetic field which is made unstable with the large external disturbance. For this reason, in this stage, in view of preventing the display direction from being fluctuated by the effect of external disturbance, the display direction determining block 7 maintains the display direction without change. FIG. 5 shows an example corresponding to this situation.

However, there is a case where the current direction of vehicle is made different from the previous direction of vehicle not by the effect of external disturbance but even by the fact that the vehicle is turning in a certain direction.

Thus, the display direction determining block 7 compares the previous display direction with the previous direction of vehicle to determine the traveling direction (1) of the vehicle, and compares the previous direction of vehicle with the current direction of vehicle to determine the traveling direction (2) of the vehicle. In a case where the traveling direction (1) agrees with the traveling direction (2) (step ST7), the display direction determining block 7 determines that the vehicle is turning in the traveling direction and updates the current display direction to the traveling direction side of the vehicle by one directional section from the previous display direction (step ST8). FIG. 6 shows an example corresponding to this situation.

For example, when attention is paid to an example on the leftmost side in FIG. 6, the previous display direction is "N" and the previous direction of vehicle is "NNE: north, northeast". Then, the traveling direction (1) of the vehicle is turning from N to E direction (hereinafter it is referred to as N→E). On the other hand, the previous direction of vehicle is "NNE" and the current direction of vehicle is "NE: north east". Then, the traveling direction (2) of the vehicle is turning from N to E direction, N→E. Thus, the traveling direction (1) agrees with the traveling direction (2). Therefore, the display direction determining block 7 updates the current display direction to the traveling direction side of the vehicle by one directional section from the previous display direction "N" thereby to bring the current display direction to "NNE".

In this regard, FIG. 5 shows an example in which the traveling direction (1) of the vehicle does not agree with the traveling direction (2) of the vehicle. For example, when attention is paid to an example on the leftmost side in FIG. 5, the previous-display direction-is "N" and the previous direction of vehicle is "NNW: north, north west". Then, the traveling direction (1) of the vehicle is N→W. The previous direction of vehicle is "NNW" and the current direction of vehicle is "NE". Then, the traveling direction (2) of the vehicle is N→E. Thus, the traveling direction (1) does not agree with the traveling direction (2). Therefore, the display direction determining block 7 maintains the display direction without change (step ST4).

When the display direction determining block 7 determines the current display direction in the above described manner, the display control block 9 of the direction providing unit 8 controls the direction indicator 10 in such a way that the direction indicator 10 indicates the current display direction (step ST9).

As is evident from the above description, this embodiment 1 is so structured as to determine the current display direction in consideration of the historical information of the direction of vehicle specified by the direction specifying unit 1 and the previous display direction, so that the device according to this embodiment 1 produces an effect of ensuring stability and trackability in the display direction at the same time.

Further, the device according to this embodiment 1 is so structured as to repeatedly detect the geomagnetism and to determine the mean value of geomagnetism during the sampling period thereby to determine the directional section to which the mean value of geomagnetism belongs as the direction of vehicle, so that this embodiment 1 can produce an effect of lessening the effect of external disturbance.

Still further, the device according to this embodiment 1 is structured in such a way that in a case where the current direction of vehicle specified by the direction specifying unit 1 agrees with the previous direction of vehicle, the current display direction is made to agree with the current direction of vehicle, so that in a case where the effect of external disturbance is little, this embodiment 1 can produce an effect of enhancing trackability in the display direction.

Still further, the device according to this embodiment 1 is structured in such a way that in a case where the current direction of vehicle specified by the direction specifying unit 1 is different from the previous direction of vehicle, the current display direction is made to agree with the previous display direction, so that in a case where a possibility is high that the vehicle may run in the magnetic field made unstable by large external disturbance, this embodiment 1 can produce an effect of preventing the display direction from being fluctuated by the effect of external disturbance.

Still further, the device according to this embodiment 1 is structured in such a way that even in a case where the current direction of vehicle is different from the previous direction of vehicle, the traveling direction of the vehicle is specified from the current direction of vehicle, the previous direction of vehicle and the previous display direction, and that the current display direction is updated to the traveling direction side of the vehicle by one directional section from the previous display direction if the traveling direction of the vehicle is constant, so that this embodiment 1 can produce an effect of enhancing trackability in the display direction when the vehicle is turning.

EMBODIMENT 2

Figure 7:
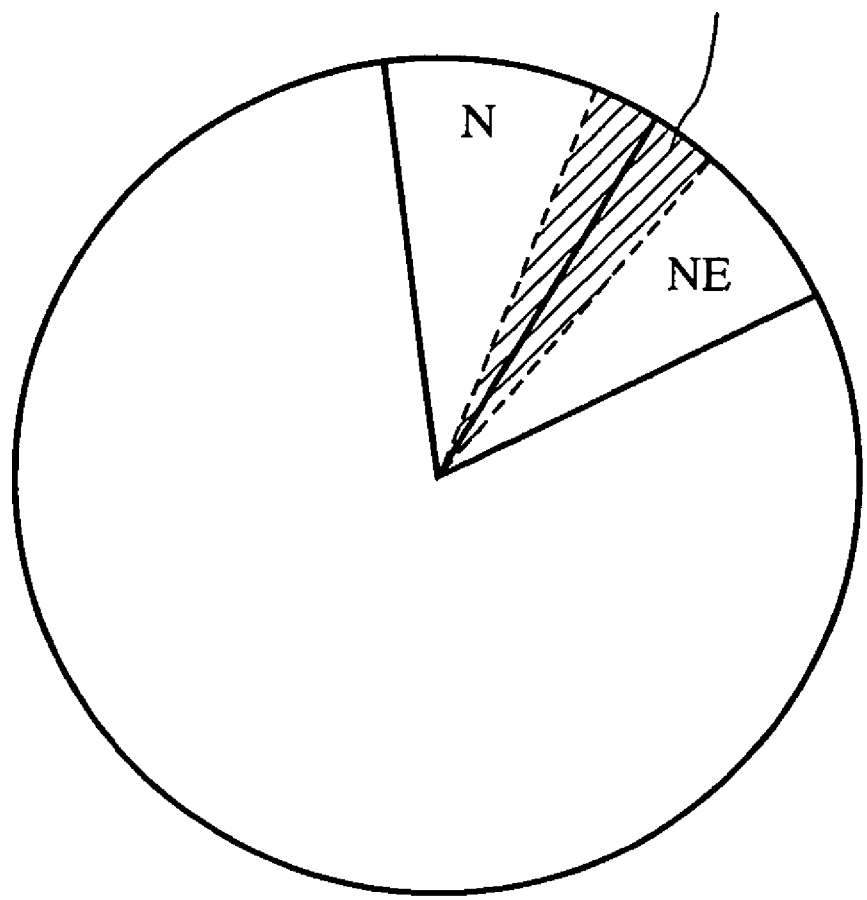
FIG. 7 is an explanatory drawing to show directional sections in which a margin region to prevent chattering is provided.

In the above described embodiment 1 has been shown an embodiment in which in a case where the current direction of vehicle agrees with the previous direction of vehicle, the display direction determining block 7 makes the current display direction agree with the current direction of vehicle. However, as shown in FIG. 7, in a case where a margin region to prevent chattering is provided at a boundary of the directional sections, it is also recommended that if the latest mean value of the geomagnetism calculated by the direction specifying block 4 is within the margin region, the current display direction is made to agree with the previous display direction, and that if the latest mean value of the geomagnetism is without the margin region, the current display direction is made to agree with the current direction of vehicle.

For example, when the previous display direction is "N" and the current direction of vehicle is "NE", in a case where the latest mean value of the detected data calculated by the direction specifying block 4 is within the margin region to prevent chattering (belongs to the hatched region in FIG. 7), in order to prevent fluctuations in the display direction, the display direction determining block 7 maintains the display direction "N" without change.

On the other hand, in a case where the latest mean value of the detected data is without the margin region to prevent chattering (belongs to the right side of the hatched region in FIG. 7), the display direction determining block 7 changes the current display direction to "NE".

According to this embodiment 2, it is possible to produce an effect of preventing fluctuations in the display direction which is caused by that the direction of vehicle is at the boundary of the directional sections.

EMBODIMENT 3

In the above embodiment 2 has been shown a case where the margin region to prevent chattering is provided at a boundary of the directional sections. However, it is also recommended that the margin region to prevent chattering can be changed depending on a situation.

That is, in a case where the current direction of vehicle specified by the direction specifying block 4, the previous direction of vehicle and the second previous direction of vehicle agree with each other (in a case where three consecutive directions of the vehicle are the same), the margin region to prevent chattering is made narrower. For example, the margin region is made narrower to a region of about 5 degrees.

Thereafter, the current direction of vehicle specified by the direction specifying block 4 becomes different from the previous direction of vehicle, the margin region to prevent chattering is returned to the original size. For example, the margin region is set to a region of about 10 degrees.

By this arrangement, in a case where the vehicle stably travels in a place where the magnetic field is little disturbed, the margin region to prevent chattering becomes narrower, which can produce an effect of proving more correct display direction.

What is claimed is:

1. A direction indicating device comprising:
a directional section specifying unit that detects geomagnetism to specify a directional section of a vehicle;
a display directional section determining unit that determines a current display directional section in consideration of historical information of the directional section of the vehicle specified by the directional section specifying unit and a previous display directional section; and a directional section providing unit that provides the current display directional section determined by the display directional section determining unit.

2. The direction indicating device as claimed in claim 1, wherein the directional section specifying unit repeatedly detects geomagnetism and finds a mean value of the geomagnetism during a sampling period and specifies the directional section to which the mean value of the geomagnetism belongs, as the direction of the vehicle.

3. The direction indicating device as claimed in claim 1, wherein when the current directional section of the vehicle specified by the directional section specifying unit agrees with a previous directional section of the vehicle, the display directional section determining unit makes the current display directional section agree with the current directional section of the vehicle.

4. The direction indicating device as claimed in claim 2, wherein when the current directional section of the vehicle specified by the directional section specifying unit agrees with the previous directional section of the vehicle, if the latest mean value of geomagnetism is within a margin region provided to prevent chattering at a boundary of the directional sections, the display directional section determining unit makes the current display directional section agree with the previous display directional section, and if the latest mean value of geomagnetism is without the margin region, the display directional section determining unit makes the current display directional section agree with the current directional section of vehicle.

5. The direction indicating device is claimed in claim 4, wherein when the current directional section of the vehicle specified by the directional section specifying unit, the previous directional section of the vehicle and the second previous directional section of the vehicle agree with each other, the display directional section determining unit narrows the margin region.

6. The direction indicating device as claimed in claim 5, wherein when the current directional section of the vehicle specified by the directional section specifying unit is different from the previous directional section of the vehicle, the display directional section determining unit returns the margin region to its original size.

7. The direction indicating device as claimed in claim 1, wherein when the current directional section of the vehicle specified by the directional section specifying unit is different from the previous directional section of the vehicle, the display directional section determining unit makes the current display directional section agree with the previous display directional section.

8. The direction indicating device as claimed in claim 1, wherein when the current directional section of the vehicle is different from the previous directional section of the vehicle, the display directional section determining unit determines a traveling directional section of the vehicle from the current directional section of the vehicle, the previous directional section of the vehicle, and the previous display directional section, and if the traveling directional section is constant, the display directional section determining unit updates the current display directional section to the traveling directional section side of the vehicle by one directional section from the previous display directional section.

* * * * *